(12) United States Patent
Knight et al.

(10) Patent No.: US 9,208,168 B2
(45) Date of Patent: Dec. 8, 2015

(54) INTER-PROTOCOL COPY OFFLOAD

(71) Applicant: NetApp, Inc., Sunnyvale, CA (US)

(72) Inventors: Frederick E. Knight, Cary, NC (US); John Meneghini, Waltham, MA (US); Arun Kumar Rajendran, Bangalore (IN); Saji Kumar Vijaya Kumari Rajendran Nair, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/681,096

(22) Filed: Nov. 19, 2012

(65) Prior Publication Data

US 2014/0143286 A1    May 22, 2014

(51) Int. Cl.
   *G06F 17/30* (2006.01)

(52) U.S. Cl.
   CPC .... *G06F 17/30203* (2013.01); *G06F 17/30206* (2013.01)

(58) Field of Classification Search
   CPC .................................................. G06F 17/30203
   See application file for complete search history.

(56) References Cited

U.S. PATENT DOCUMENTS

| | | | |
|---|---|---|---|
| 5,819,292 A | 10/1998 | Hitz et al. | |
| 6,237,008 B1 * | 5/2001 | Beal et al. ............................. | 1/1 |
| 7,454,445 B2 | 11/2008 | Lewis et al. | |
| 8,886,882 B2 * | 11/2014 | Nakajima ........... | G06F 12/0862 711/117 |
| 2002/0078244 A1 * | 6/2002 | Howard ........................ | 709/248 |
| 2004/0233910 A1 | 11/2004 | Chen et al. | |
| 2006/0072580 A1 | 4/2006 | Dropps et al. | |
| 2007/0088802 A1 * | 4/2007 | Malkin .......................... | 709/217 |
| 2007/0094466 A1 * | 4/2007 | Sharma et al. ................ | 711/162 |
| 2012/0059797 A1 | 3/2012 | Prahlad et al. | |
| 2012/0079583 A1 | 3/2012 | Christiansen et al. | |
| 2012/0110281 A1 * | 5/2012 | Green et al. .................. | 711/154 |
| 2013/0054530 A1 * | 2/2013 | Baker ............... | G06F 17/30079 707/639 |

FOREIGN PATENT DOCUMENTS

WO    WO-2007042954 A2    4/2007

OTHER PUBLICATIONS

Frederick Knight, "Storage Data Movement Offload", NetApp, Sep. 2011.*
James Lentini, "NFS Server-side Copy Design and Standardization", Advanced Technology Group, NetApp, 2010.*
International Search Report and Written Opinion for Application No. PCT/US2013/070046; Applicant: NetApp, Inc.; Date of mailing: Feb. 26, 2014(9 pages).

* cited by examiner

*Primary Examiner* — James E Richardson
(74) *Attorney, Agent, or Firm* — Kilpatrick Townsend & Stockton LLP

(57) ABSTRACT

Methods and apparatuses for performing inter-protocol copy offload operations are provided. In one embodiment, a method includes receiving a request in a first interface protocol from a host device. The request is a request to copy a data set from a source data storage location to a destination data storage location. The request includes a token, representing the data set, to be copied that was created using a second interface protocol that is different from the first interface protocol. The method also includes transferring the data set, in response to receiving the request, from the source data storage location to the destination data storage location without transferring the data set to the host device.

29 Claims, 8 Drawing Sheets

INTER-PROTOCOL COPY OFFLOAD

TECHNICAL FIELD

Various embodiments of the present application generally relate to the field of managing data on data storage devices. More specifically, various embodiments of the present application relate to methods and systems for performing inter-protocol copy offload operations.

BACKGROUND

The proliferation of computers and computing systems has resulted in a continually growing need for efficient and reliable storage of data. Host computing devices make use of data storage devices of many types and complexities to satisfy the growing data storage needs. The types of data storage devices commonly used range from individual flash memory devices and hard drives to storage servers and clusters of storage servers. A storage server is a specialized computer that provides storage services related to the organization and storage of data, to one or more clients. The data is typically stored on writable persistent storage media, such as non-volatile memories and disks. A storage server is configured to operate according to a client/server model of information delivery and may enable many clients or applications to access the data served by the system. A storage server can employ a storage architecture that serves the data with both random and streaming access patterns at either a file level, as in network attached storage (NAS) environments, or at the block level, as in a storage area network (SAN).

A traditional method for a host to make a copy of a selected data set is for the host to read the data set from the source storage device into the memory of the host and then transfer the data set to the destination storage location, under the control of the host. This may be accomplished by the host performing a series of buffered read/write processes on smaller chunks of the data set that is being copied. In addition, data sets are sometimes copied from one location in a storage device or system to another location within that same storage device or system. The host controlled or host-centric copy process described above, in which the copied data flows through the host, is typically used even in cases where the source and the destination for the copy operation are within the same storage device or system.

While the host-centric copy process described above may be acceptable if the host has available bandwidth and/or the quantity of data is relatively small, the burdens associated with copying data in this manner can become significant in some cases. In addition to consuming central processing unit (CPU) resources of the host, if the data is transferred over a network, network bandwidth is also unnecessarily consumed because the data is first transferred to the host and then from the host to the destination. Processes called "copy offload" processes allow these types of data transfers to occur in a more efficient manner by transferring data directly between storage devices or systems, for example from one disk drive to another.

In the copy offload processes described above, a token is created and later returned to the storage device or system to initiate copying of the data from one location to another. Between the time the token is created and returned to the storage device, the token may also be transferred or exchanged among various hosts. Once a host returns the token to the destination storage device, the copy process occurs through communication between the source and the destination storage locations without the data having to flow through any of the hosts and without the hosts managing the data transfer process.

In addition to reducing the use of host computing resources, and potentially network bandwidth, the use of a token allows the copy or data transfer process to be separated from other operations of the host. Once the host interacts with the source storage device to create the token, the actual copying or transfer of the data can occur at a later point in time. In some cases the token may be transferred to a second host device. The copy process is started when the second host provides the token to the storage device or system. However, current implementations only allow copy offload processes involving more than one host to occur when both hosts are using the same interface protocol to communicate with the storage device(s) or system(s). Similarly, current copy offload implementations involving more than one storage device or system are only supported when the storage devices or systems utilize the same interface protocol. For example, when a token is created for a host that communicates with a storage system using a SCSI interface, that token can only be used by other SCSI hosts and can only be used for copying the associated data to other SCSI storage devices or systems.

SUMMARY

Methods and apparatuses for inter-protocol copy offload processes are introduced here. These methods and apparatuses resolve the problems described above by providing support for inter-protocol token-based copy offload processes that are compatible with hosts, storage devices, and storage systems using different interface protocols.

In one embodiment, a method includes receiving a request in a first interface protocol from a host device. The request is a request to copy a data set from a source data storage location to a destination data storage location. The request includes a token, representing the data set, to be copied that was created using a second interface protocol that is different from the first interface protocol. The method also includes transferring the data set, in response to receiving the request, from the source data storage location to the destination data storage location without transferring the data set to the host device.

In another embodiment, a data storage system is provided. The data storage system includes a first communication interface using a first interface protocol, a second communication interface using a second interface protocol, and a copy system processor. The copy system processor is configured to receive a request at the first communication interface from a host device. The request is a request to copy a data set from a source storage location in a data storage device to a destination storage location. The request includes a token that represents the data set and was created using the second communication interface. The copy system processor is also configured to validate the token and transfer the data set from the source storage location to the destination storage location without transferring the data set through the host device.

Using the techniques introduced herein, token-based copy offload processes can be performed among devices that use different interface protocols. This allows the benefits of copy offload processes, such as host computing resource savings and network bandwidth savings, to be realized when copying data in multi-protocol data storage environments. For example, a host communicating with a data storage system using a SCSI interface may request and received a copy offload token. That token may be transferred to a second host that communicates with the data storage system using a Common Internet File System (CIFS) interface. The token is transferred to the data storage system, using CIFS, and is used by the data storage system to identify the data associated with the token and copy the data even though the token was created for a SCSI host and returned for use by a CIFS client using a CIFS interface.

Embodiments introduced here also include other methods, systems with various components, and non-transitory machine-readable storage media storing instructions that, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
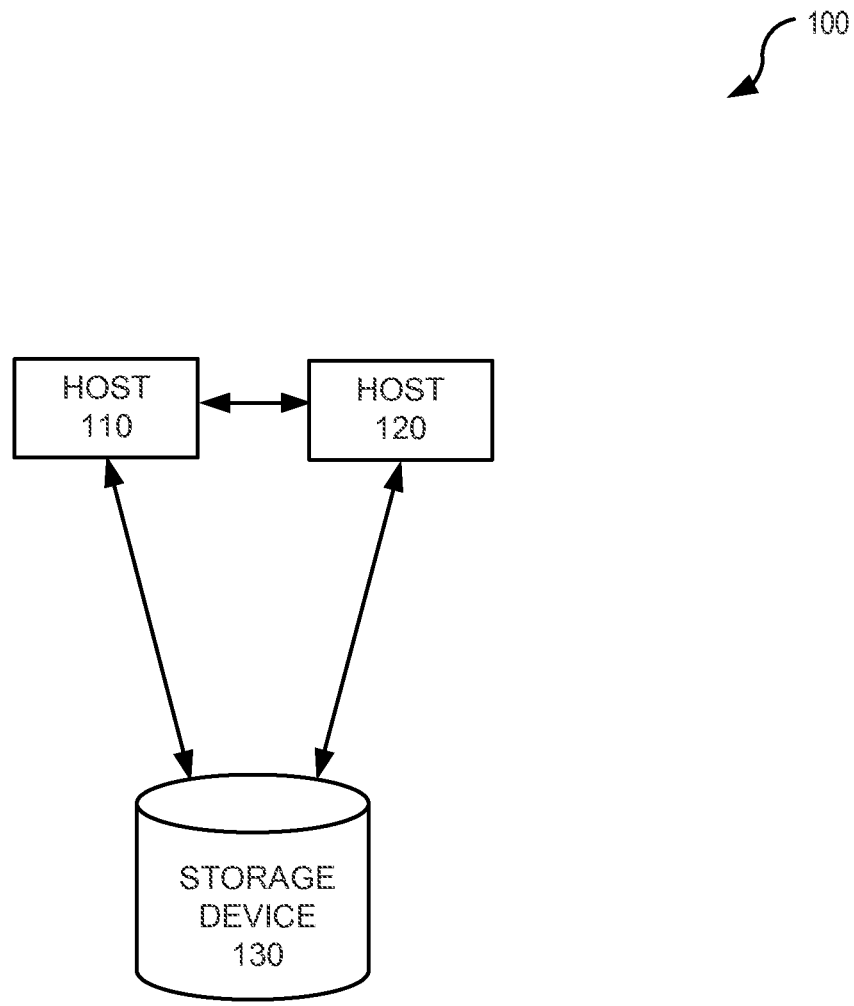
FIG. 1 illustrates an operating environment in which some embodiments of the disclosed techniques may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Traditional methods of copying data from one data storage location to another require a host to read data from a storage device and then transfer that data to a destination storage location. This approach has typically been used even when the data is being copied to another location within the same storage device. This approach lacks efficiency because it uses host computing resources and communication resources unnecessarily. Copy offload processes were developed in order to allow data copy and data transfer to occur directly between storage devices or systems without the data having to flow through one or more hosts. In a tokenized copy offload process, a host that seeks to copy or transfer data sends a request to a source storage device identifying the data to be copied or transferred. In the storage device, the data is located and a token is created that is a representation of the data. The token does not contain the data but acts as a unique identifier and/or locator for the data and is later used to transfer the associated data between the storage devices or systems.

In existing systems, these tokenized copy offload processes can only take place among hosts and data storage devices that use the same interface protocol. This limits the use of tokenized copy offload processes to environments using only a single interface protocol. The techniques introduced here address this problem. The techniques provide a method in which a token for a copy offload process can be created for a first host interacting with a source storage device in one interface protocol and can be used by a second host interacting with a destination storage device in a different interface protocol. In some cases, the source storage device and the destination storage device may be one storage device or system that is capable of interfacing with multiple hosts using different interface protocols. In other cases, the source storage device and the destination storage device are not the same storage device and each communicates with its respective host(s) using a different interface protocol.

In either case, an inter-protocol copy offload token can be provided to a destination storage device using a different interface protocol than was used to communicate with the host storage device when the token was created. Once the token is received by the destination storage device, the token is transferred from the destination storage device to the source storage device and the data is transferred from the source storage device to the destination storage device in response. The two storage devices are both able to make use of the token even though they interact with hosts using different interface protocols.

FIG. 1 illustrates operating environment 100 in which some embodiments of the solution introduced here may be utilized. Operating environment 100 includes host 110, host 120, and storage device 130. Each of host 110, host 120, and storage device 130 are configured to communicate with the other devices. Communication may occur through a direct link between the devices or may occur through one or more networks or other devices, such as a router.

Host 110 and host 120 are any type of computing devices that interface with data storage devices. For example, each of host 110 and host 120 may be a server, a personal computer, a laptop computer, a smartphone, a tablet, or a microprocessor. Host 110 and host 120 may each also be a specialized computing device for controlling or interfacing to storage devices or systems such as a storage controller, a data access component, or a file server. Host 110 and host 120 are each users and/or providers of data that is stored on storage device 130. In some cases, one or both of host 110 and host 120 may also be referred to as clients.

Storage device 130 is any type of device for storing data. Storage device 130 may comprise a physical storage medium or media capable of storing data, for example, electronically, magnetically, and/or optically. Storage device 130 may include, for example, a hard disk drive (HDD), a solid state storage device, a tape drive, an optical drive, or other type of non-volatile data storage device, including combinations thereof. Storage device 130 may also contain volatile memory such as random access memory (RAM). In some cases, storage device 130 may be a storage server or other storage management device that interfaces to a physical storage medium, but does not include the physical storage medium.

In some cases, storage device 130 may be a single hard disk drive with an integrated controller. In other cases, storage device 130 may be a much more complex storage device or system. For example, storage device 130 may be a network-attached storage (NAS) system, a storage area network (SAN), or a component thereof, such as a storage server. The various elements used to implement storage device 130 may be located physically together or distributed in various geographical locations. If storage device 130 comprises multiple physical storage mediums, the storage mediums may be arranged in a tiered storage arrangement or in a non-tiered storage arrangement.

Storage device 130 may also be implemented as a logical data container or as a storage abstraction rather than as actual physical storage. A storage abstraction may include, for example, a file, volume, disk, virtual disk, logical unit, data stream, alternate data stream, metadata stream, or the like. Any abstraction may be repeated to any arbitrary depth. Storage device 130 may also be implemented using combinations of the implementations described above.

For purposes of simplifying the description, only two hosts and one storage device are shown in operating environment 100; however, additional hosts and/or storage devices can be present in practice.

Figure 2:
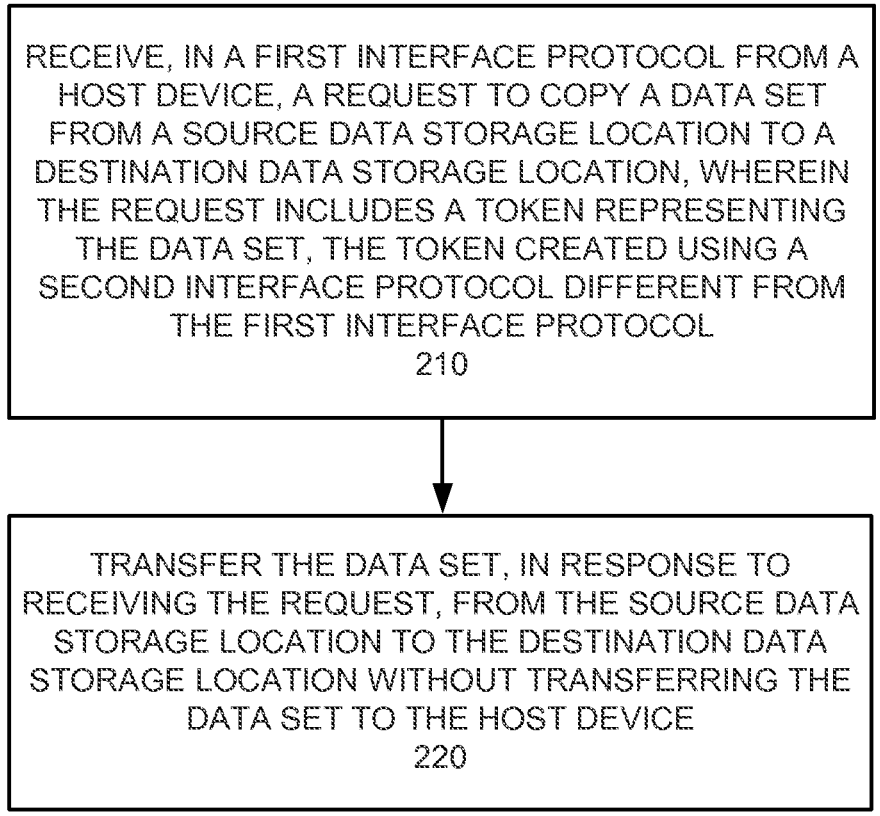
FIG. 2 illustrates a method of performing an inter-protocol copy offload operation.

FIG. 2 illustrates method 200 of performing an inter-protocol copy offload operation in one embodiment of the solution introduced here. FIG. 2 is described with respect to operating environment 100 although use in other operating environments is possible.

In method 200, storage device 130 receives a request in a first interface protocol from host device 110 (step 210). The request is to copy a data set from a source data storage location in storage device 130 to a destination data storage location in storage device 130. The request includes a token that represents the data set to be copied. The token was previously created based on a request from host 120 to storage device 130 using a second interface protocol that is different from the first interface protocol. The method also includes storage device 130 transferring the data set in response to receiving the request from host 110 (step 220). The transfer is from the source data storage location in storage device 130 to the destination data storage location in storage device 130. The data transfer occurs without transferring the data set to host device 110 or host device 120.

Advantageously, storage device 130 is able to process a token for a copy offload operation that is received from a host using one interface protocol even though the token was created for a different host communicating with storage device 130 using a different interface protocol. Storage device 130 is capable of producing and utilizing a token that is compatible with multiple interface protocols. For example, host 120 may communicate with storage device 130 using a SCSI interface and host 110 may communicate with storage device 130 using a Network File System (NFS) interface. The token is created in the SCSI environment, but is ultimately used to conduct the copy operation in the NFS environment. Other combinations of interface protocols are possible and the invention is not to be limited to any particular interface protocol or combination of interface protocols.

The disclosed techniques enable inter-protocol copy offload processes to be performed. Previously, copy offload processes were only possible when the involved hosts and storage devices(s) used the same interface protocol. Previous inter-protocol copy operations required the copied data to be transferred through one or more of the hosts using traditional buffered read/write operations and could not be performed as copy offload operations in which the data is not transferred through one or more of the hosts.

The inter-protocol token described in the examples herein is a representation of the data that will be copied and allows a host to reference the data without actually obtaining a copy of the data. After storage device 130 creates the token, it maintains information about the data such that the data can be identified and located when the token is returned. In some cases, a token may contain a random or pseudorandom number that is difficult to guess or arbitrarily generate. The token is typically much smaller than the data it represents. In some cases, the token is 512 bytes long.

Figure 3:
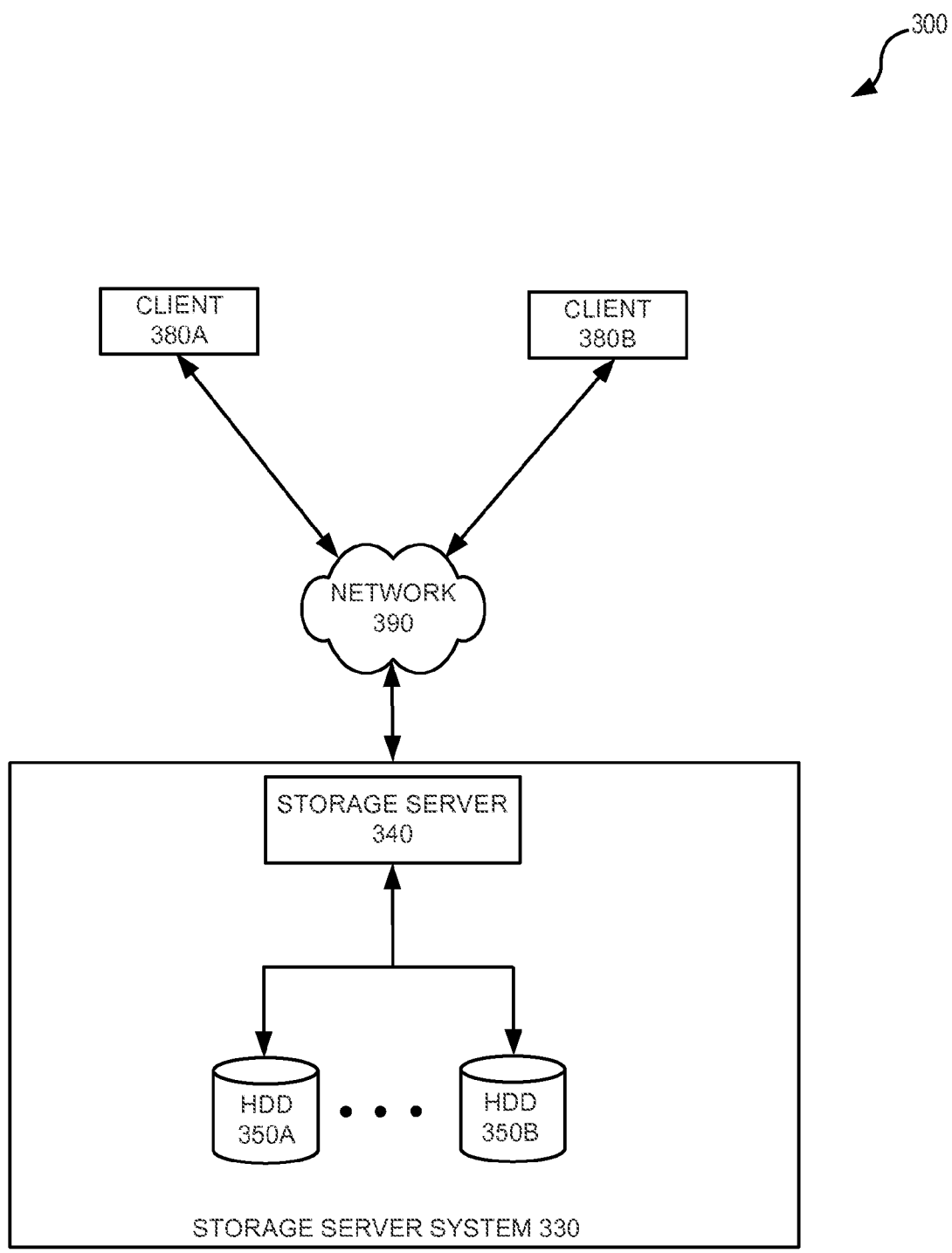
FIG. 3 illustrates an operating environment in which some embodiments of the disclosed techniques may be utilized.

FIG. 3 illustrates operating environment 300 in which some embodiments of the techniques introduced here may be utilized. Operating environment 300 includes storage server system 330, clients 380A and 380B, and network 390.

Storage server system 330 includes storage server 340, HDD 350A, and HDD 350B. Storage server system 330 may also include other devices or storage components of different types that are used to manage, contain, or provide access to data or data storage resources. Storage server 340 is a computing device that includes a storage operating system that implements one or more file systems. Storage server 340 may be a server-class computer that provides storage services relating to the organization of information on writable, persistent storage media such as HDD 350A and HDD 350B. HDD 350A and HDD 350B are hard disk drives. Storage server system 330 may also include other types of storage devices or memory including solid state drives (SSDs), tape drives, optical drives, and flash memory. A typical storage server system will include many more HDDs, or other storage devices, than are illustrated in FIG. 3. Storage server system 330 is illustrated as a monolithic system, but could include systems or devices which are distributed among various geographic locations. Storage server system 330 may also include additional storage servers which operate using storage operating systems which are the same or different from storage server 340.

Storage server 340 provides data storage services for clients such as client 380A and client 380B. Each of client 380A and 380B may communicate with storage server 340 using an interface protocol such as SCSI, CIFS, NFS, or another interface protocol, including combinations thereof. The techniques and the teachings of this description can be adapted to a variety of storage architectures including, but not limited to, NAS, SAN, a disk assembly directly-attached to a client or host computer, an individual disk with a disk controller, or to another type of storage device. The term "storage server" should therefore be taken broadly to include such arrangements.

In one embodiment of the techniques introduced here, an inter-protocol copy offload operation is performed on data stored in storage server system 330. The data may initially be stored on a single storage device of storage server system 330 or may be spread across a number of storage devices which make up storage server system 330 using one or more known methods or architectures such as Redundant Array of Independent Disks (RAID). Client 380A initiates the inter-protocol copy offload operation by sending a request to storage server system 330 in a first protocol. The request includes an identification of data that client 380A wishes to copy. The data may be a single file, a group of files, a directory, a group of directories, an entire volume, or any other group or subset of data stored by storage server system 330.

Upon receiving the request, storage server 340 identifies the data of interest and creates an inter-protocol copy offload token that is a representation of or a unique identifier for the data. Storage server 340 then returns the token, or a copy of the token, to client 380A using the first interface protocol. The token has been created for use in and communicated using the first interface protocol. In some cases, the token is compliant with a standard associated with the first interface protocol specifying a format for copy offload tokens. However, the token also contains information that allows it to be used with and interpreted by devices using at least one other interface protocol.

In this example, the inter-protocol token is then transferred from client 380A to client 380B. Client 380B communicates with storage server system 330 using a second interface protocol. Client 380B uses the token to initiate the second stage of the inter-protocol copy offload operation. The second stage involves the actual copying or transfer of the data associated with the token from the source storage location to a destination storage location. The copy stage of the copy offload operation may be performed immediately after the creation of the token or may be performed at a later time. In order to initiate the copying, the token is transmitted to storage server 340 by client 380B along with an identification of a destination storage location for the copy offload operation. In this example, the destination is another location within storage server system 330.

Although the token was created for client 380A in response to communications conducted using the first interface protocol and may contain a format compatible with the first interface protocol, it is transferred to storage server system 330 by client 380B using the second interface protocol. Storage server 340 receives the token using the second interface protocol, but is able to resolve, based on information in the token, that it was created in an interaction with a client using the first interface protocol and may have a format associated with the first interface protocol. In other words, storage server 340 is capable of producing and processing tokens that are compatible with multiple interface protocols. Storage server 340 uses the received token to identify and locate the data associated with the token. This process may include verifying or validating the token.

In the preceding example, both the source data storage location and the destination data storage location are within storage server system 330. In some cases, the source and the destination storage locations may be in the same storage device, but represent different logical locations within that storage device.

Copy offload processes are also sometimes referred to as offloaded data transfer (ODX) processes and are defined for Microsoft Windows. In the Windows ODX operation, a host transmits a request to a source storage device or system identifying data to be copied. The host receives a token representing the data of interest from the storage device. The token does not contain the data but acts as a unique identifier and/or locator for the data. The host then uses an offload write command, including the token, to request data movement from the source to a destination storage location. Windows ODX is designed to work with storage devices which implement the Small Computer System Interface (SCSI) standard. Specifically, Windows ODX features are supported in devices that implement SCSI Primary Commands-4 (SPC-4) and SCSI Block Commands-3 (SBC-3). These commands are defined by T10 technical committee of the International Committee on Information Technology Standards (INCITS) which is responsible for SCSI architectural standards and storage interfaces. Copy offload processes are not limited to Windows or SCSI devices.

In some examples of the techniques disclosed herein, the inter-protocol token is created using a single token format that is vendor specific but also compliant with one or more industry standards. For example, the SCSI T10 SPC-4 standard defines a 512 byte copy offload token. According to the standard, the first four bytes, numbered zero through three, are used to define a Representation of Data (ROD) type. Although the standard defines how all 512 bytes are to be used, the standard also specifies that the four ROD type bytes may be used to indicate that the token has a vendor specific format. In the case of a vendor specific format, the bytes numbered 8 through 511, are used to implement the vendor specific token format. This inter-protocol token may be compliant with the SCSI copy offload standard but also contain information enabling a properly configured storage server to use the token in conjunction with other interface protocols (i.e., CIFS, NFS). In this way, a storage server providing services using multiple protocols can implement and process tokens in a manner that allows a host using one of the protocols to exchange tokens with another host that uses another of the protocols without either host having any information about the other's protocol and without taking any steps to accommodate the other's protocol.

In some cases, the inter-protocol token format may be proprietary or vendor specific. Storage devices, storage systems, and/or storage servers that are configured for processing vendor specific inter-protocol tokens can support inter-protocol copy offload processes among hosts using different interface protocols, while devices, systems or servers that are not configured to support these inter-protocol tokens may not be able to support these operations. A vendor specific token format that supports specified interface protocols may also be subsequently extended to accommodate additional interface protocols.

Figure 4:
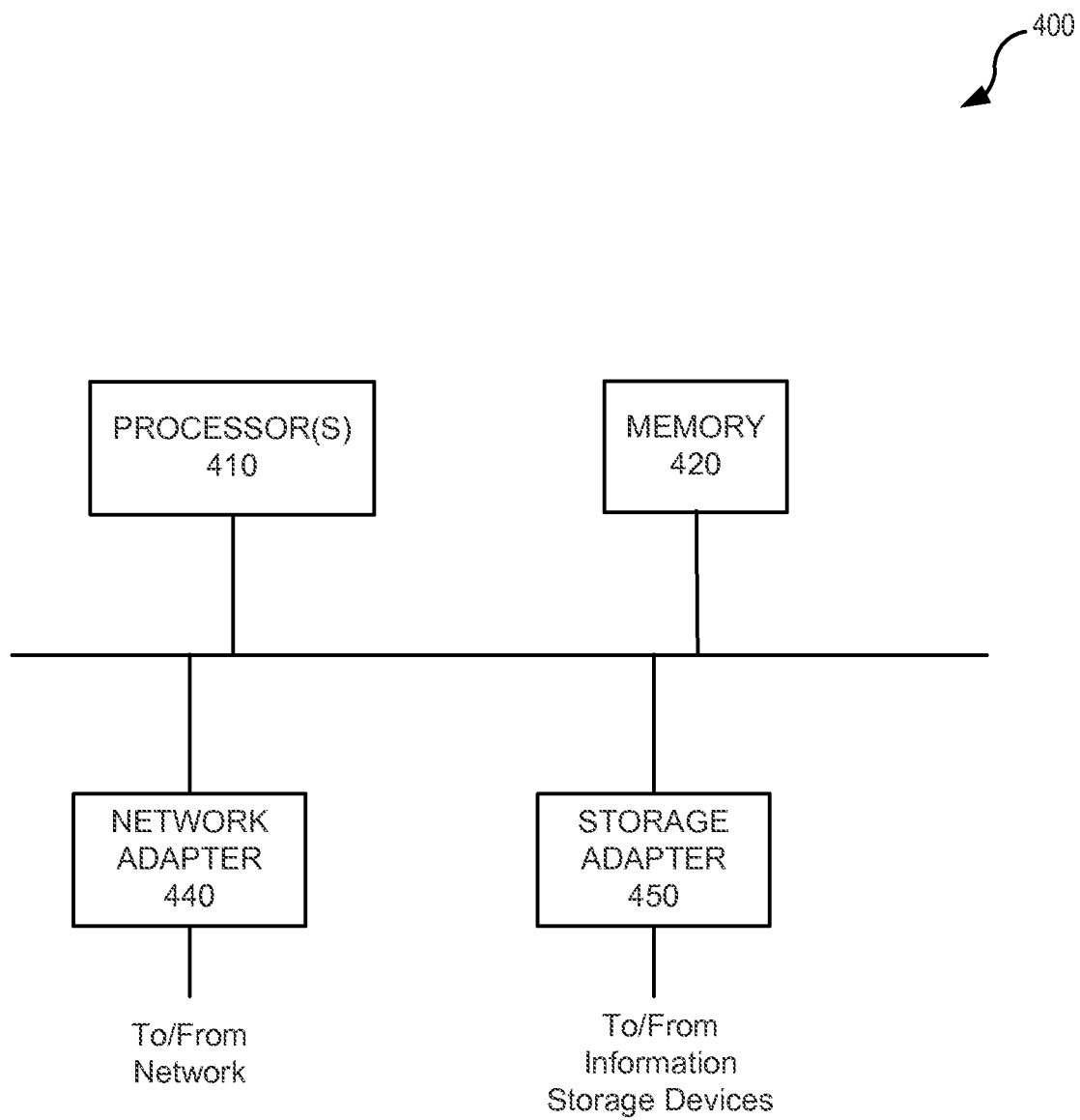
FIG. 4 illustrates a storage server that may be used in an embodiment of the disclosed techniques.

FIG. 4 illustrates storage server 400 in which at least some embodiments of the disclosed techniques may be utilized. Storage server 400 is one example of storage server 340. Storage server 400 includes processor(s) 410, a memory 420, a network adapter 440, and a storage adapter 450. Processor(s) 410 may implement storage management functions to logically organize data as a hierarchical structure of named directories, files, and/or data blocks.

Network adapter 440 includes one or more ports to couple storage server 400 with one or more clients, hosts, or other storage servers, over point-to-point links, wide area networks, virtual private networks implemented over a public network (Internet), or a shared local area network. Network adapter 440 can include the mechanical components as well as the electrical and signaling circuitry needed to connect storage server 400 to a network. Clients and hosts can communicate with storage server 400 over the network by exchanging packets or frames of data according to pre-defined protocols, such as Transmission Control Protocol/Internet Protocol (TCP/IP).

Storage adapter 450 provides an interface to information storage devices. The information storage devices may be any type of attached array of writable storage media, such as magnetic disk or tape, optical disk (e.g., CD-ROM or DVD), flash memory, solid-state drive (SSD), electronic random access memory (RAM), micro-electro mechanical, and/or any other similar media adapted to store information, including data and parity information. Storage adapter 450 includes a plurality of ports having I/O interface circuitry that couples with the storage devices over an I/O interconnect arrangement, such as a conventional high-performance, Fibre Channel link topology.

Memory 420 comprises storage locations that are addressable by processor(s) 410 and adapters 440 and 450 for storing software program code and data associated with the techniques introduced here.

In one example of the techniques introduced here, processor(s) 410 performs an inter-protocol copy offload process to copy data from one storage location accessed using storage adapter 450 to another storage location accessed using storage adapter 450. In response to a request received from a host using a first interface protocol, processor(s) 410 creates an inter-protocol copy offload token that represents data to be copied and returns it to the requesting host using network adapter 440. The inter-protocol token is later received by storage server 400 from a different host that uses a different interface protocol. Because the token has been formatted such that processor(s) 410 can use it to accommodate requests associated with both interface protocols, storage server 400 is able to process the token and perform the associated copy offload operation even though the token was created for a host using one interface protocol and returned by a host using a different interface protocol.

Figure 5:
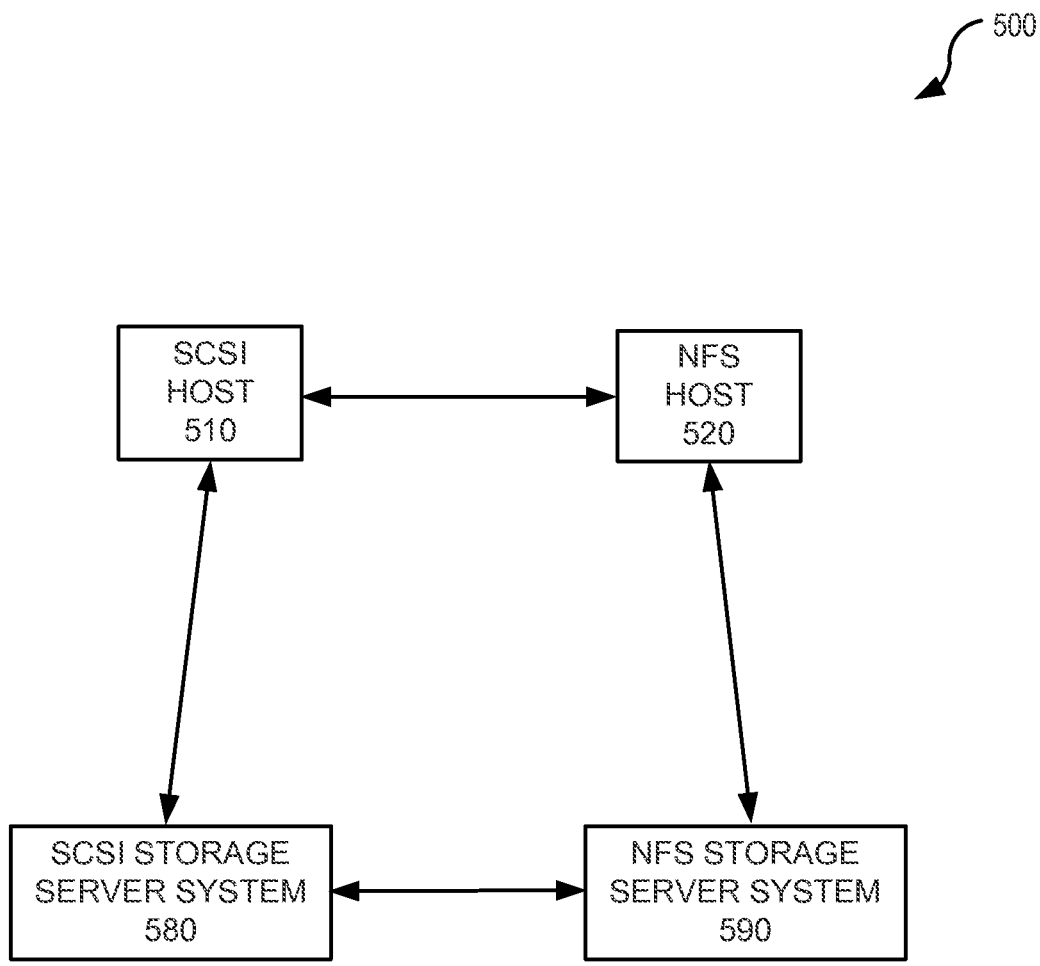
FIG. 5 illustrates an operating environment in which the disclosed techniques may be used with two storage server systems.

FIG. 5 illustrates operating environment 500 in which some embodiments of the disclosed solution may be implemented. Operating environment 500 illustrates a case in which the source storage location and the destination storage location are in two different storage server systems. Operating environment 500 includes SCSI host 510, NFS host 520, SCSI storage server system 580, and NFS storage server system 590. SCSI storage server system 580 is an example of storage server system 330 and is accessed using a SCSI interface. NFS storage server system 590 is also an example of storage server system 330 and is accessed using an NFS interface. SCSI host 510 is an example of host 110 or host 120 that uses SCSI for storing data to or retrieving data from SCSI storage server system 580. NFS host 520 is an example of host 110 or host 120 that uses NFS for storing data to or retrieving data from NFS storage server system 590.

In one embodiment of the disclosed techniques, NFS storage server system 590 is the source data storage location and SCSI storage server system 580 is the destination data storage location for a copy offload operation. If a data set needs to be copied from NFS storage server system 590 to SCSI storage server system 580, conventional copy offload processes cannot be used because an NFS token would not be understood by the SCSI devices and a SCSI token would not be understood by the NFS devices.

In the inter-protocol copy offload techniques disclosed here, NFS host 520 transmits a message to NFS storage server system 590 identifying the data to be copied and requesting a token for the data. NFS storage server system 590 identifies the data, creates the inter-protocol token, and transmits the token to NFS host 520. NFS host 520 transfers the token to SCSI host 510 in order to allow SCSI host 510 to have the data copied to its destination of choice. Although the token is created in an NFS environment, it includes information allowing it to be used by devices of other protocols, such as SCSI, that are properly configured to process inter-protocol tokens of this type.

In this example, SCSI host 510 makes a determination that SCSI storage server system 580 will be the destination location for the data associated with the token. To initiate the copy portion of the process, SCSI host 510 transmits the token to SCSI storage server system 580. Although SCSI storage server system 580 is a SCSI device and the token is an NFS compatible token, SCSI storage server system 580 is configured to interpret the token. SCSI storage server system 580 identifies NFS storage server system 590 as the location of the source data and transfers the token to NFS storage server system 590. In response to receiving the token, NFS storage server system 590 validates the token and begins transferring the associated data directly to SCSI storage server system 580 without transferring the data through NFS host 520 or SCSI host 510. The token and the data may be transferred between NFS storage server system 590 and SCSI storage server system 580 using SCSI, NFS, or another interface protocol. In some cases, SCSI Storage Server System 580 and NFS Storage Server System 590 may communicate with each other using a proprietary interface protocol.

It should be understood that the copy offload process described in the example above may also occur in the reverse direction. In this case, SCSI storage server system 580 is the source data storage location and NFS storage server system 590 is the destination storage location. SCSI storage server system 580 generates a token in response to a request from SCSI host 510. After receiving the token, SCSI host 510 transfers the token to NFS host 520. Then, NFS host 520 transfers the token to NFS storage server system 590. Upon receiving the token from NFS storage server system 590, SCSI storage server system 580 transfers the data associated with the token to NFS storage server system 590 without transferring the data to SCSI host 510 or to NFS host 520. In addition to use with the hosts and the storage server systems illustrated in FIG. 5, the techniques described herein may also be implemented with host, clients, storage server systems, and/or storage devices using other interface protocols, such as CIFS.

When an inter-protocol copy offload token is created, the data associated with the token may be subject to change at any time. If the associated data changes before the token is utilized, the token may no longer be valid because it no longer represents the data that existed at the time the token was created. There are several possible solutions to this problem.

One solution is to make a copy of the associated data in the source storage device when the token is created. If the original instance of the data changes in the interim, the copy can remain unchanged and can be used to perform the copy offload process. Another possible solution is to invalidate a token whenever the associated data changes. This approach is sometimes called write tracking and requires continuous monitoring of the data for any potential write activities. Although this approach introduces only a moderate amount of additional host computational overhead, it eliminates some of the usefulness of the token approach because the lifetime of the token is unknown and the token may be invalidated before it is used.

Another possible solution to the problem is referred to as copy-on-write. A copy of the data associated with the token is not created at the time the token is created, but all writes to the device or system are monitored to determine if a write will affect or change any data for which a token has been created. If such a change is detected, a copy of the data is then made, before the writing, such that a copy is maintained that is representative of the state of the data at the time the token was created.

Yet another solution is to create a persistent point in time image of the data associated with the token when the token is created. In systems where new and changed data is written to new physical storage locations, a persistent point-in-time image remains unchanged even when the underlying data is changed. In some known storage systems, when data is changed, the system does not modify the changed data blocks in place. Rather, it writes each modified data block to a new physical storage location and changes the associated pointers. The original data blocks therefore are retained and remain unchanged. A persistent point-in-time image can be created in such a system such that the image is not truly a "copy" because no actual copies of the underlying data blocks are made when the persistent point-in-time image is created. Instead, the persistent point-in-time image is created by simply creating a new metadata block and storing in it pointers to the existing data blocks. The result is a read-only view of the underlying data that represents a frozen-time view of the underlying data at the point in time when the persistent point-in-time image was created that does not require copies to be made of any of the underlying data blocks. Systems implementing persistent point-in-time images enable access to older versions of the underlying data. The data associated with the inter-protocol copy offload processes and inter-protocol tokens discussed herein may be maintained using persistent point-in-time images.

Figure 6:
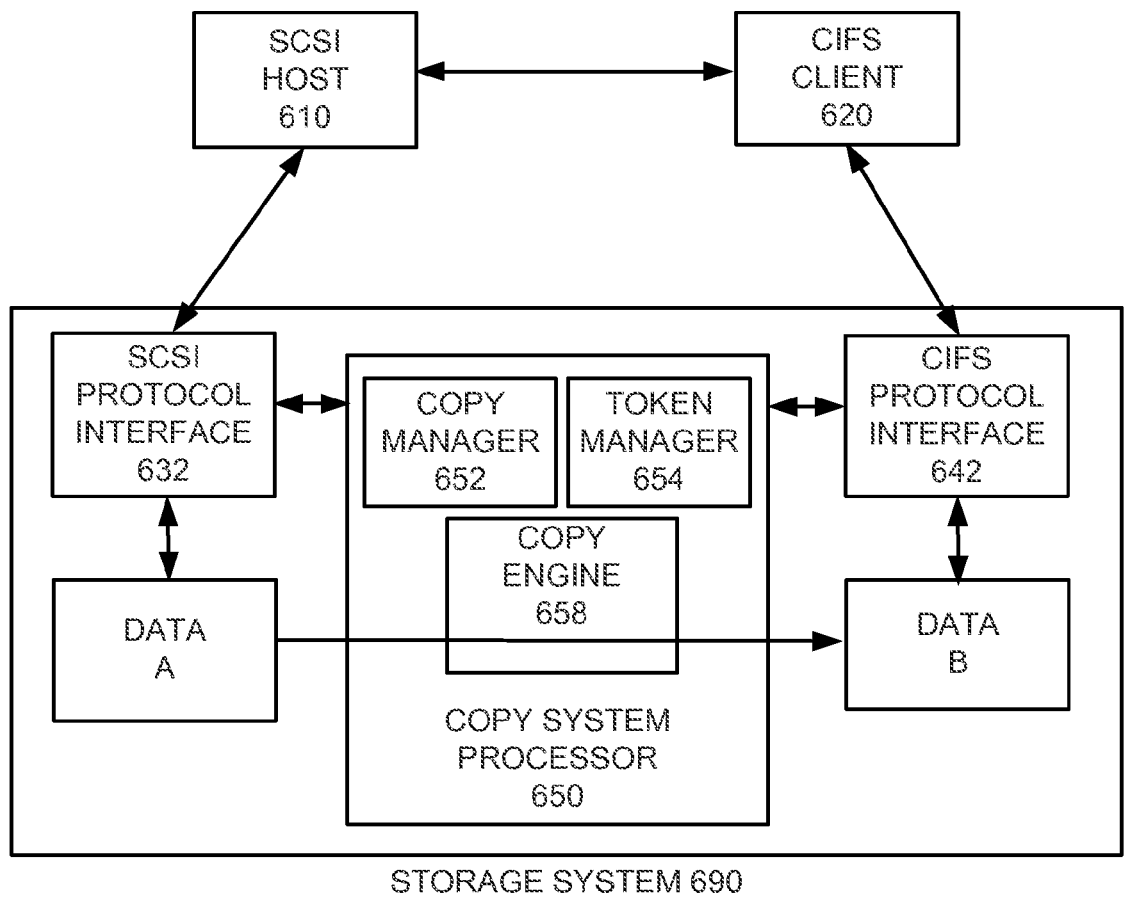
FIG. 6 illustrates a storage system with inter-protocol copy offload capability.

FIG. 6 illustrates multi-protocol storage system 690 having inter-protocol copy offload capability. Storage server system 690 includes SCSI protocol interface 632, CIFS protocol interface 642, copy system processor 650, and data. SCSI protocol interface 632 and CIFS protocol interface 642 are each communication interfaces used to manage communications with hosts and clients that use the corresponding interface protocols. In FIG. 6, SCSI protocol interface 632 is used for communication with SCSI host 610, as well as with other SCSI hosts or SCSI devices. CIFS protocol interface 642 is used for communication with CIFS client 620, as well as with other CIFS clients or devices.

Copy system processor 650 of storage system 690 includes copy manager 652, token manager 654, and copy engine 658. Copy system processor 650 may be implemented using one or more or a variety of hardware computing devices such as a microprocessor, a CPU, a special-purpose processor programmed with the instructions to perform the steps, or a combination thereof. A variety of the functions associated with copy system processor 650 may also be embodied in machine-executable instructions, which may be used to cause one or more general-purpose computing devices to perform the functions. Alternatively, the functions of copy system processor 650, including the functions of copy manager 652, token manager 654, and copy engine 658, may be performed by a combination of hardware, software, and/or firmware.

Storage system 690 provides data storage services to SCSI host 610 and CIFS client 620 and may also provide data storage services to other host or clients, including other hosts or clients using other interface protocols, such as NFS. In order to initiate a copy offload process, SCSI host 610 transmits a token request to storage server system 690. When SCSI protocol interface 632 receives the token request, it communicates the request to copy system processor 650. Copy system processor 650 invokes token manager 654 to create an inter-protocol token associated with the appropriate data. In this example, the data associated with the token is data A. The inter-protocol token is compatible with a SCSI copy offload standard and also contains information that enables copy system processor 650 to support use of the token in the CIFS environment.

If SCSI protocol interface 632 receives a request to write data based on the inter-protocol token, it again communicates with copy system processor 650. Copy system processor 650 invokes token manager 654 to determine which data is associated with the token and invokes copy engine 658 to copy the data. Copy engine 658 is able to copy data A to any location within storage system 690 regardless of the protocol used to create the token and regardless of the protocol used for receiving the token.

If CIFS protocol interface 642 receives a request for a token, it communicates the request to copy system processor 650. Copy system processor 650 invokes token manager 654 to create the inter-protocol token and associate the appropriate data with the token. When CIFS protocol interface 642 receives a request to write the data associated with the token, it again communicates with copy system processor 650. Copy system processor 650 invokes token manager 654 to determine which data is associated with the token and invokes copy engine 658 to copy the data. Copy engine 658 copies the data from any location to any other location within storage system 690 regardless of which protocol is used to create the token and regardless of which protocol is used to receive the request to copy the data (i.e., receive the token).

The data transfers that result from the inter-protocol copy offload operations flow though copy engine 658 but do not flow through SCSI host 610 or CIFS client 620. As illustrated in some of the other examples, the destination location for the data being copied may also be in another storage device or system.

Figure 7:
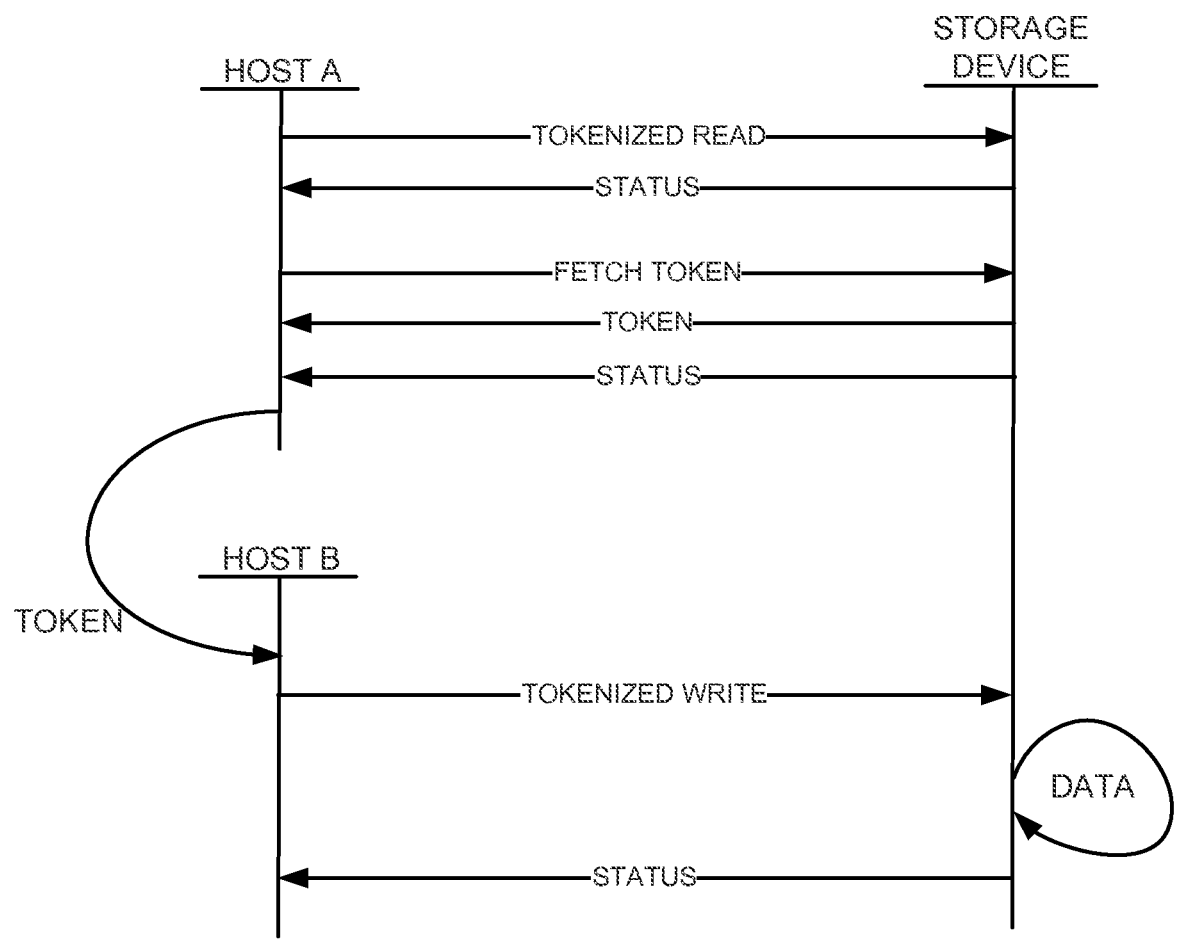
FIG. 7 illustrates communication between two hosts and a storage device for performing an inter-protocol copy offload operation.

FIG. 7 illustrates communication between two hosts and a storage device for performing an inter-protocol copy offload process in one embodiment of the techniques introduced here. In some cases, the storage device of FIG. 7 may include the physical storage medium that data is stored on. In other cases, the storage device of FIG. 7 may be a storage server, storage management device, or storage control device that does not include the physical storage media.

In the example of FIG. 7, host A transmits a tokenized read message to the storage device using a first interface protocol. The tokenized read message includes an identification of the data that is to be copied. The storage device identifies the data to be copied and generates an inter-protocol copy offload token. In some cases the storage device also returns a status message to host A. In some cases, the storage device may transmit the token back to host A in response to the request to create the token. In some cases, to obtain the token, host A may transmit a fetch token message to the storage device. In response, the storage device transmits the token to host A using the first interface protocol. In some cases, this may also be followed by a status message.

At a later point in time, host A transfers the token to host B and host B transfers the token to the storage device in a tokenized write message using a second interface protocol that is different than the first interface protocol. In some cases, the tokenized write message includes a destination location for the copy of the data. Even though the token is received in a communication associated with the second interface protocol, the storage device is programmed to determine that the token was created for a host using the first interface protocol and is able to decode and process the token accordingly. After performing any necessary verification or validation processes, the storage device then copies the data associated with the token to the destination. Finally, the storage device transmits a status message back to host B in the second interface protocol when the process is complete.

Figure 8:
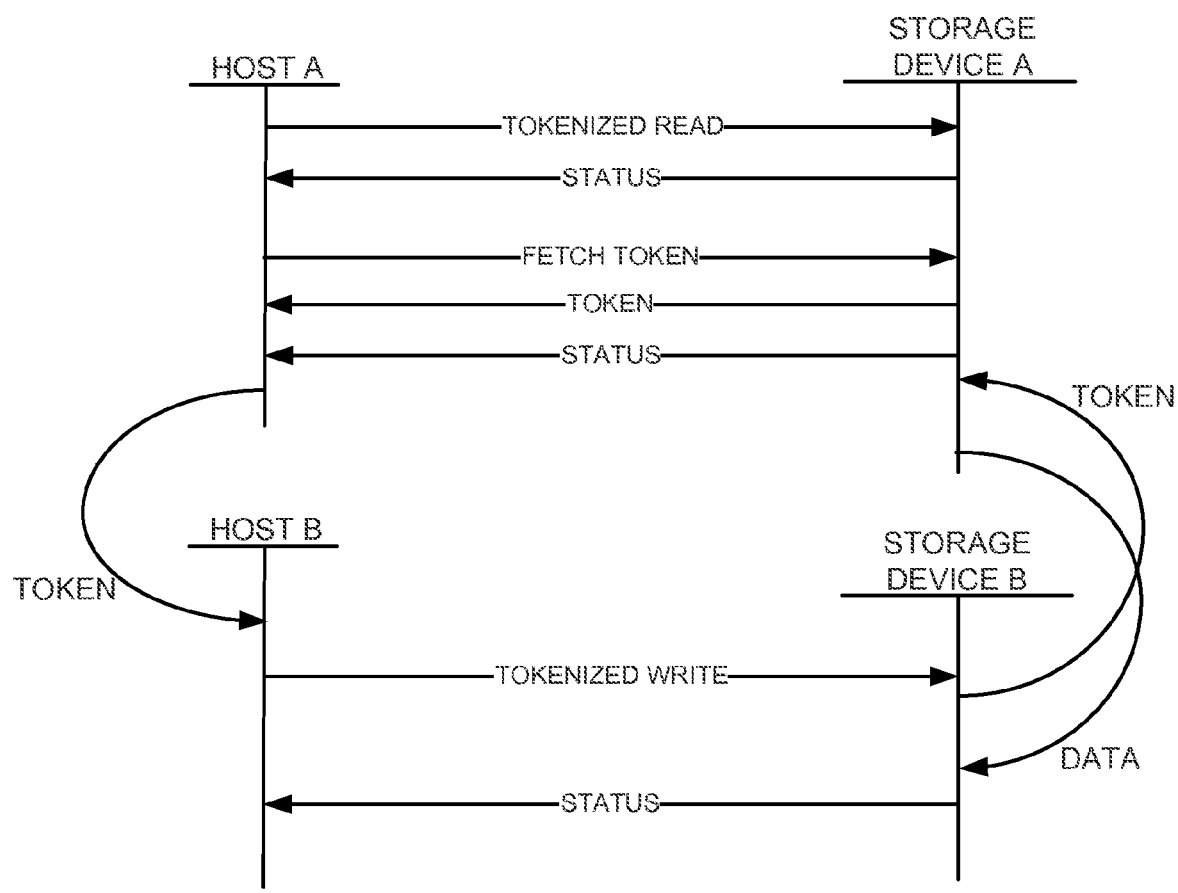
FIG. 8 illustrates communication between two hosts and two storage devices for performing an inter-protocol copy offload operation.

FIG. 8 illustrates a variation of the example of FIG. 7 in which the source data location and the destination storage location for the inter-protocol copy offload process are in different storage devices. Similar to the communication process illustrated in FIG. 7, host A transmits a tokenized read message to storage device A in a first interface protocol and receives an inter-protocol token in response to a fetch token request message. Then, host A transfers the inter-protocol token to host B.

In order to complete the inter-protocol copy offload process, host B transmits the token to a storage device B that is the destination for the copy offload process. The token is transmitted in a tokenized write message using a second interface protocol. The tokenized write message includes the inter-protocol token. Even though storage device B uses the second interface protocol and the token was created in a format associated with the first interface protocol, storage device B is configured to decode the token and determine that it is associated with storage device A. This is due to additional information encoded in the token and the ability of storage device B to interpret that additional information. Storage device B transmits the received token to storage device A. Storage device A uses the token to identify and locate the data and transmits the associated data blocks to storage device B in response to receiving the token.

In some cases, additional messages may be exchanged between the storage devices in conjunction with the data transfer. For example, storage device B may first send the token to device A to have the data prepared and then send additional commands to extract the prepared data from device A. Once the transfer is complete, storage device B may transmit a status message to the host. The transfer of the data from the source to the destination may be conducted using a push model or a pull model. In a push model, the source storage device, after receiving and verifying the token, controls the process through which the data is transferred to the destination storage device. In a pull model, the destination storage controls the transfer process by retrieving or reading the data from the source storage device after the token has been verified. As illustrated, the data is transferred between the storage devices to complete the copy offload process and is not transmitted to or through either of the hosts.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to, optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the solution introduced here may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some cases," "in some examples," and the like generally mean the particular feature, structure, or characteristic following the phrase is included in at least one embodiment of the solution introduced here, and may be included in more than one embodiment. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method comprising:
  receiving, at a storage system, from a host device, a request to copy a data set from a source data storage location to a destination data storage location, wherein the request is a message of a first interface protocol and includes an inter-protocol token formatted according to a format specified by a second interface protocol different from the first interface protocol, wherein the inter-protocol token has encoded within it a representation of the data set in the source location and information indicating that the inter-protocol token is compliant with a standard associated with the second interface protocol;
  decoding, by storage system, the inter-protocol token using the information indicating that it is compliant with the standard associated with the second interface protocol;
  validating, by the storage system, the inter-protocol token; and
  transferring, by the storage system, the data set, in response to validating the inter-protocol token, from the source data storage location to the destination data storage location without transferring the data set to the host device.

2. The method of claim 1 wherein the source data storage location and the destination data storage location are in the same storage device and wherein transferring the data set includes making a copy of the data set and storing the copy in the destination storage location.

3. The method of claim 1 wherein the source data storage location and the destination data storage location are in different storage devices and wherein the data is transferred from the source data storage location to the destination data storage location using a third interface protocol.

4. The method of claim 1 further comprising, prior to receiving the request to copy the data set:
  receiving, by the storage system, from a requesting device, a request to generate the token, wherein the request to generate the token is a message of the second interface protocol;
  generating, by the storage system, the inter-protocol token based on information in the request to generate the token that identifies the data set; and
  transmitting, by the storage system, the inter-protocol token to the requesting device in a response message of the second interface protocol.

5. The method of claim 4 wherein generating the inter-protocol token includes creating a persistent point-in-time image of the data set in the source data storage location by generating pointers to data blocks of the data set and without duplicating the data blocks.

6. The method of claim 5 wherein transferring the data set includes transferring the persistent point-in-time image.

7. The method of claim 4 wherein the request to generate the token is a tokenized read message and the request to copy the data set is a tokenized write message.

8. The method of claim 1 wherein the first interface protocol is one of:

Small Computer System Interface (SCSI), Common Interface File System (CIFS), or Network File System (NFS).

9. The method of claim 1 wherein the second interface protocol is one of: Small Computer System Interface (SCSI), Common Interface File System (CIFS), or Network File System (NFS).

10. The method of claim 1 wherein the inter-protocol token has a vendor-specific format and contains information indicating the vendor-specific format.

11. The method of claim 1 wherein transferring the data set from the source data storage location to the destination data storage location comprises a copy offload operation.

12. The method of claim 11 wherein the copy offload operation is a Small Computer System Interface (SCSI) T10 compliant copy offload operation and the token is compliant with the SCSI T10 SCSI Primary Commands 4 (SPC-4) standard.

13. A data storage system comprising:
a first communication interface for communicating with a first host device using a first interface protocol;
a second communication interface for communicating with a second host device using a second interface protocol that is different from the first interface protocol; and
a hardware copy system processor configured to:
receive, via the first communication interface from the first host device, a copy offload request to transfer a data set from a source storage location to a destination storage location, wherein the copy offload request is a message of the first interface protocol;
in response to the copy offload request, generate an inter-protocol token, wherein the copy system processor formats the inter-protocol token according to a format specified by the first interface protocol and encodes within in it a representation of the data set in the source location and information indicating that the inter-protocol token is compliant with a standard associated with the first interface protocol;
communicate with the first host device via the first communication interface using the first interface protocol in order to transmit the inter-protocol token to the first host device;
after transmitting the inter-protocol token to the first host device, receive via the second communication interface from the second host device, the inter-protocol token in a message of the second interface protocol;
decode the inter-protocol token using the information indicating that it is compliant with the standard associated with the first interface protocol;
validate the inter-protocol token; and
transfer the data set, in response to validating the inter-protocol token, from the source storage location to the destination storage location without transferring the data set to either of the first host device or the second host device.

14. The data storage system of claim 13 wherein the destination storage location is in the same data storage device as the source storage location; and
wherein to transfer the data set includes to store a copy of the data set in the destination storage location.

15. The data storage system of claim 13 wherein the message of the second interface protocol is a Small Computer System Interface (SCSI) tokenized write message.

16. The data storage system of claim 13, wherein the copy offload request is a Small Computer System Interface (SCSI) tokenized read message.

17. The data storage system of claim 13, wherein to generate the inter-protocol token includes to create a persistent point-in-time image of the data set in the source storage location by generating pointers to data blocks of the data set without duplicating the data blocks.

18. The data storage system of claim 17 wherein to transfer the data set includes to transfer the persistent point-in-time image.

19. The data storage system of claim 13 wherein the data set is transferred from the source storage location to the destination storage location using a proprietary interface protocol that is different than the first interface protocol and different than the second interface protocol.

20. The data storage system of claim 13 wherein the first interface protocol is one of: Small Computer System Interface (SCSI), Common Interface File System (CIFS), or Network File System (NFS).

21. The data storage system of claim 13 wherein the second interface protocol is one of: Small Computer System Interface (SCSI), Common Interface File System (CIFS), or Network File System (NFS).

22. The data storage system of claim 13 wherein the copy system processor also encodes within the inter-protocol token information indicating that it has a vendor-specific format.

23. The data storage system of claim 13 wherein the data storage system is operated in a Network Attached Storage (NAS) environment.

24. The data storage system of claim 13 wherein the data storage system is operated in a Storage Area Network (SAN).

25. A method comprising:
receiving, at a token manager in a storage device from a first host device, a token request for a copy offload process to transfer a data set from a source storage location to a destination storage location, wherein the token request is a message of a first interface protocol;
generating, at the token manager in response to the token request, an inter-protocol token, wherein the token manager formats the inter-protocol token according to a format specified by the first interface protocol and encodes within in it a representation of the data set in the source storage location and information indicating that the inter-protocol token is compliant with a standard associated with the first interface protocol;
communicating with the first host device using the first interface protocol in order to transmit the inter-protocol token to the first host device;
after transmitting the inter-protocol token to the first host device, receiving the inter-protocol token at the token manager from a second host device in a message of a second interface protocol that is not the first interface protocol;
decoding the inter-protocol token using the information indicating that it is compliant with the standard associated with the first interface protocol; and
upon validating the inter-protocol token, accessing the data set in the source storage location using the decoded inter-protocol token and transferring the data set from the source storage location to the destination storage location without transferring the data set to the first host device and without transferring the data set to the second host device.

26. The method of claim 25 wherein the first interface protocol and the second protocol are each one of: Small Computer System Interface (SCSI), Common Interface File System (CIFS), or Network File System (NFS).

27. The method of claim 25 wherein the copy offload process is a Small Computer System Interface (SCSI) T10 compliant process.

28. The method of claim 25, wherein the destination storage location is in the same data storage device as the source storage location.

29. The method of claim 25, wherein the data set is transferred from the source storage location to the destination storage location using a proprietary interface protocol that is different than the first interface protocol and different than the second interface protocol.

* * * * *